US007035845B2

(12) United States Patent
Yao et al.

(10) Patent No.: US 7,035,845 B2
(45) Date of Patent: Apr. 25, 2006

(54) GENERIC PROXY FOR REPRESENTING SEARCH ENGINE PARTNER

(75) Inventors: Steven Yao, Sammamish, WA (US); Eric Watson, Redmond, WA (US); Saurab Nog, Bellevue, WA (US); David Snelling, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 10/146,246

(22) Filed: May 15, 2002

(65) Prior Publication Data

US 2003/0217045 A1 Nov. 20, 2003

(51) Int. Cl.
*G06F 17/30* (2006.01)

(52) U.S. Cl. .......................... 707/3; 707/10; 707/102; 709/219; 715/501.1

(58) Field of Classification Search ................ 707/3, 707/10, 5, 6, 7, 102, 4, 101; 709/218, 219; 715/501.1
See application file for complete search history.

(56) References Cited

U.S. PATENT DOCUMENTS

| | | | |
|---|---|---|---|
| 4,774,655 A * | 9/1988 | Kollin et al. ................... 707/4 |
| 6,253,208 B1 * | 6/2001 | Wittgreffe et al. ........ 707/104.1 |
| 6,278,993 B1 * | 8/2001 | Kumar et al. ................... 707/3 |
| 6,526,440 B1 | 2/2003 | Bharat ......................... 709/219 |
| 6,529,903 B1 | 3/2003 | Smith et al. ..................... 707/7 |
| 6,601,065 B1 * | 7/2003 | Nelson et al. ................... 707/4 |
| 6,615,209 B1 | 9/2003 | Gomes et al. ................... 707/5 |
| 6,658,423 B1 | 12/2003 | Pugh et al. ................... 707/102 |
| 6,678,681 B1 | 1/2004 | Brin ................................. 707/6 |
| 6,694,321 B1 * | 2/2004 | Berno .......................... 707/101 |
| 6,708,223 B1 * | 3/2004 | Wang et al. ................. 719/315 |
| 6,745,177 B1 * | 6/2004 | Kepler et al. ..................... 707/3 |
| 2002/0103823 A1 * | 8/2002 | Jackson et al. ........... 715/501.1 |
| 2002/0123988 A1 | 9/2002 | Dean et al. ....................... 707/3 |
| 2002/0133481 A1 | 9/2002 | Smith ............................. 707/3 |

FOREIGN PATENT DOCUMENTS

EP     0 809 198 A2 * 11/1997
WO    WO 02/42925 A1 * 5/2002

OTHER PUBLICATIONS

Brin, S. et al., "The Anatomy of a Large-Scale Hypertextual Web Search Engine", *The Anatomy of a Search Engine*, Aug. 7, 2000, http://www7.scu.edu.au/programme/fullpapers/1921/com1921.htm, 18 pages.

(Continued)

*Primary Examiner*—Shahid Alam
(74) *Attorney, Agent, or Firm*—Woodcock Washburn LLP

(57) ABSTRACT

A search engine receives a search query from a user and forwards the received query to a partner by way of a call to a generic proxy with the query for the partner. The generic proxy receives and processes the query, forwards the processed query to the partner, receives search results responsive to the forwarded query from the partner, and processes the received search results, all according to the configuration information corresponding to the partner. The generic proxy then forwards the processed search results to the search engine for further forwarding to the querying user. Accordingly, each of several partners has corresponding configuration information unique thereto and only the generic proxy need be developed for all of the several partners.

13 Claims, 4 Drawing Sheets

OTHER PUBLICATIONS

5th International Web Caching and Content Delivery Workshop, Lisbon, Portugal, May 22-24, 2000, *J. Computer Communications,* ISBN: 0140 3664, Feb. 1, 2001, 24(2), 1 page.

Hansen, M.H., et al., "Using navigation data to improve IR functions in the context of web search," *Proceedings of the 2001 ACM CIKM 10th International Conference on Information and Knowledge Management,* Paques, H., et al. (Eds.), ISBN: 1 58113 436, Nov. 5-10, 2001, 135-142.

Kurzke, C., et al., "WebAssist: a user profile specific information retrieval assistant," *Computer Networks and ISDN Systems,* 1998, 30, 654-655.

Wu, S., et al., "Virtual proxy servers for WWW and intelligent agents on the internet," *IEEE,* 1997, 200-209.

\* cited by examiner

US 7,035,845 B2

GENERIC PROXY FOR REPRESENTING SEARCH ENGINE PARTNER

TECHNICAL FIELD

The present invention relates to a proxy called to by a search engine and representative of a partner of the search engine. More particularly, the present invention relates to such a proxy that is generic to multiple ones of the partners, whereby the generic proxy can be arranged to represent any particular one of the multiple partners.

BACKGROUND OF THE INVENTION

A typical search engine such as the MSN SEARCH engine, a product/service of MICROSOFT Corporation of Redmond, Wash., receives a query from a user, performs a search in real- or near-real-time based on such query, and returns search results. In some search engines, the search results may be obtained from one or more sources. That is, based on the query to be searched, the search engine contacts one or more partners with the query so that each contacted partner can execute the query or a variation thereof in a partner database or the like and then return preliminary search results to the search engine. Based on all the preliminary results received from all contacted partners, and perhaps based on preliminary results from executing the query or a variation thereof in a database or the like of the search engine, the search engine formats all the preliminary results into final search results and displays same to the user that ordered the search based on the query.

The ability of a search engine to work with partners is considered to be valuable in that the search engine can acquire data from such partners that the search engine would not itself otherwise have access to, and in that the search engine need not itself maintain such data. Significantly, adding a new partner to be available to the search engine or modifying same should be relatively easy and fast so that data can be made available from the new or modified partner in a prompt manner and with minimal operational work.

Each partner accessible by the search engine is typically represented thereto by way of a proxy. As should be appreciated, the search engine forwards a query or a variation thereof to a partner by calling the proxy thereof with the query. The proxy then appropriately contacts the partner with the query, receives the preliminary search results in response, and returns same to the search engine. Of course, the proxy may also perform pre- and/or post-operation functions such as formatting the query for the partner, formatting the preliminary results for the search engine, and the like.

In the prior art, the proxy for each partner was written specifically for such partner. Accordingly, it could require a significant amount of time to write, debug, and otherwise approve such a specific proxy, on the order of weeks. Such significant amount of time is based on the relatively large amount of coding, testing and operational time required. Plainly, such a time frame runs counter to the objective of adding a new partner or modifying same in a relatively easy and fast manner with minimal operational work.

Thus, a need exists for a proxy that allows adding a new partner or modifying same in such relatively easy and fast manner with minimal operational work. In particular, a need exists for a proxy that allows adding a new partner or modifying same with relatively little effort and time, and also with relatively little modification to the search engine itself.

SUMMARY OF THE INVENTION

The aforementioned need is satisfied by the present invention in which a search engine receives a search query from a user and forwards the received query to a partner by way of a call to a generic proxy with the query for the partner. The generic proxy receives and processes the query according to configuration information corresponding to the partner, forwards the processed query to the partner according to the configuration information corresponding to the partner, receives search results responsive to the forwarded query from the partner according to the configuration information corresponding to the partner, processes the received search results according to the configuration information corresponding to the partner, and forwards the processed search results to the search engine for further forwarding to the querying user. Accordingly, each of several partners has corresponding configuration information unique thereto and only the generic proxy need be developed for all of the several partners.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
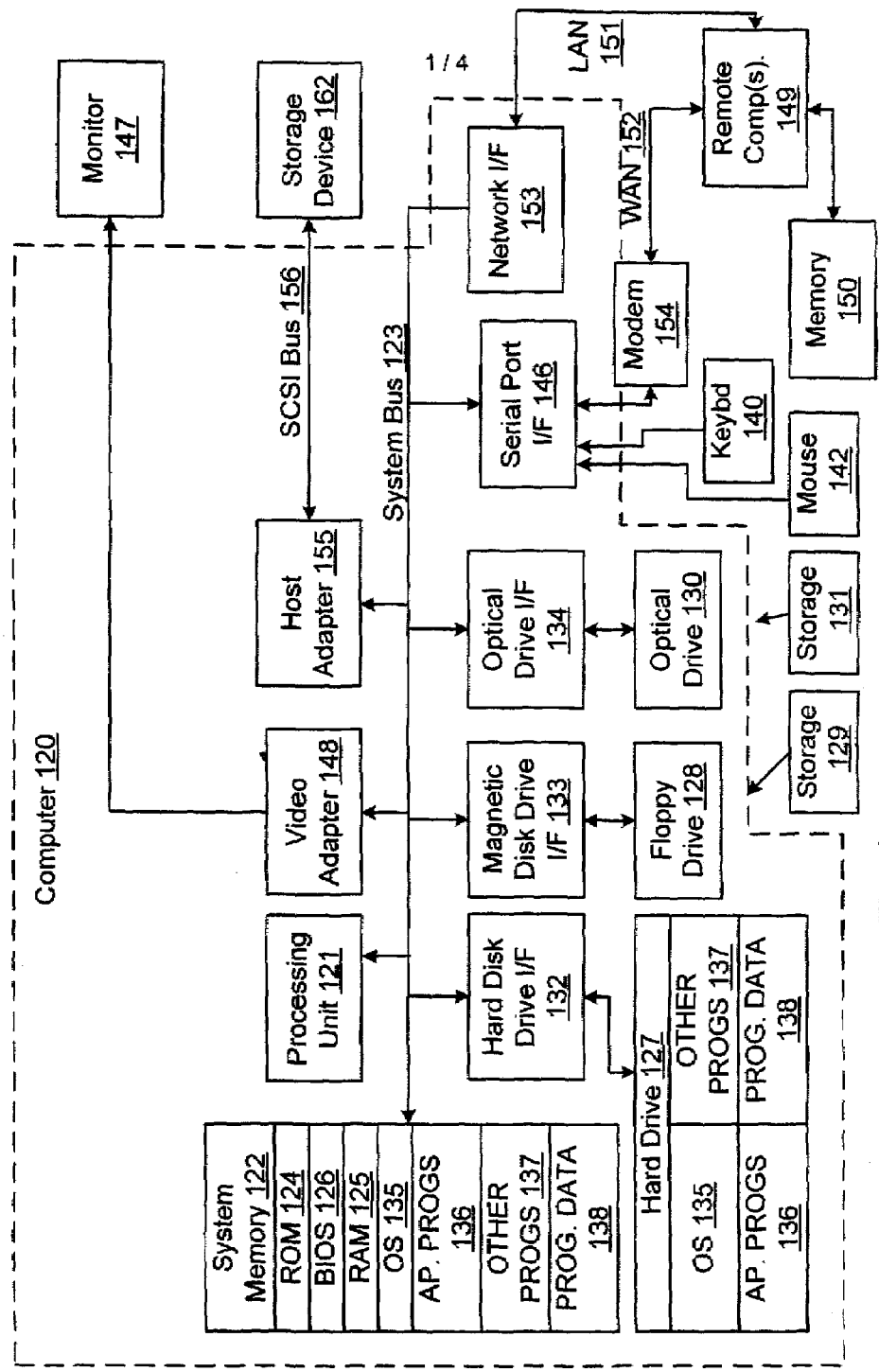
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System and Method of the Present Invention

Figure 2:
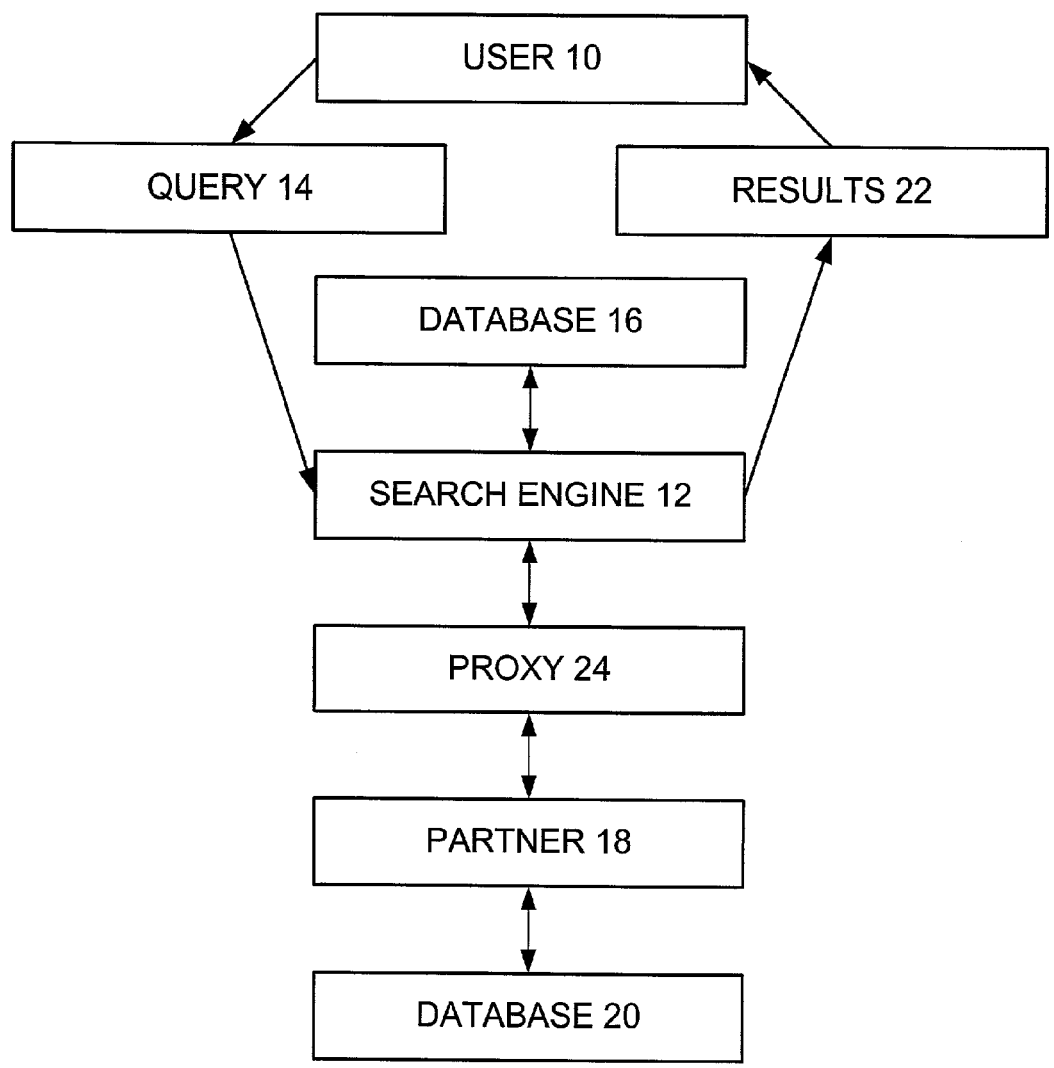
FIG. 2 is a block diagram showing a search engine forwarding a search query to a partner by way of a proxy and receiving search results from the partner by way of the proxy in accordance with one embodiment of the present invention.
Figure 3:
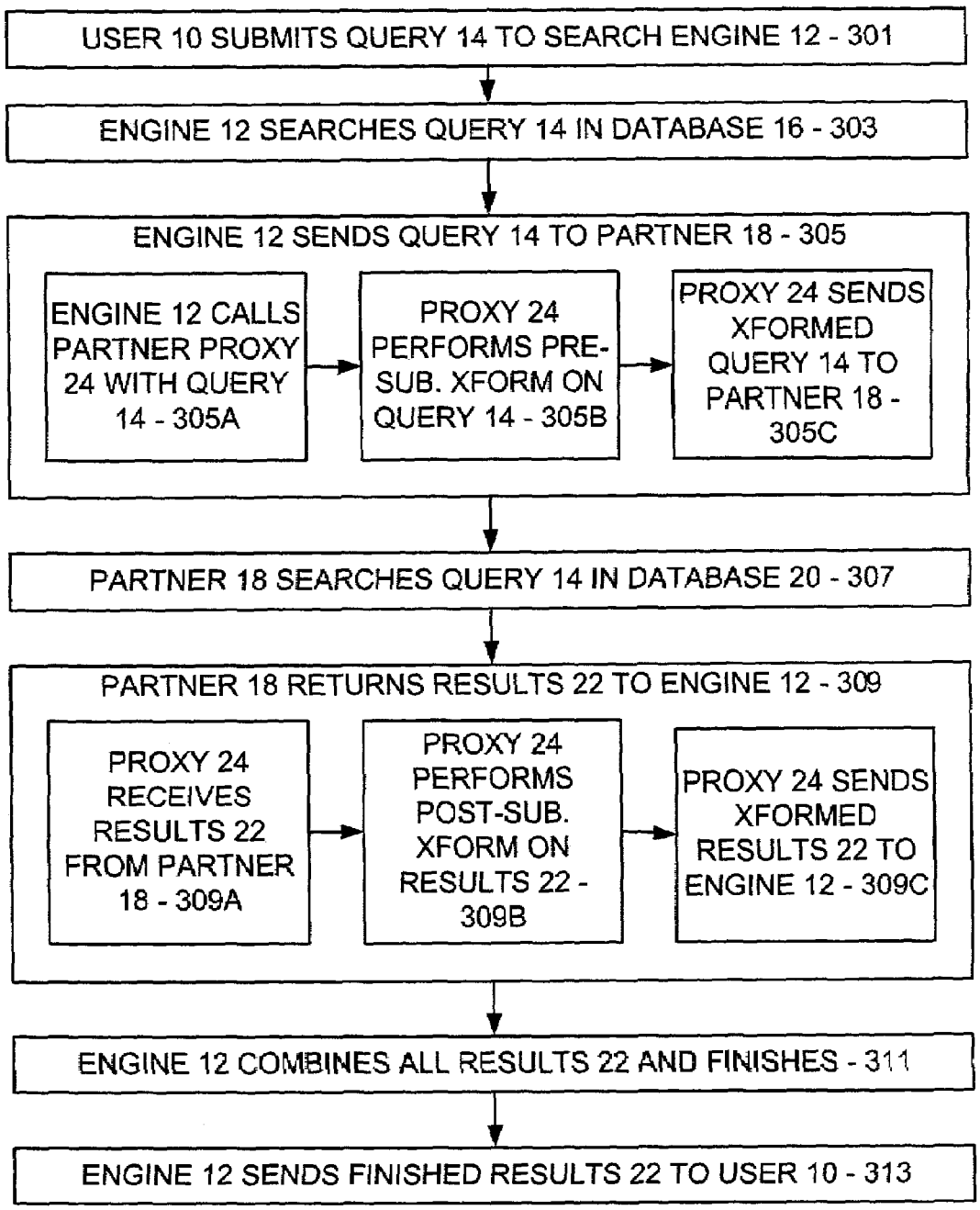
FIG. 3 is a flow diagram showing steps performed in forwarding the search query to the partner and receiving the search results from the partner by way of the proxy of FIG. 2 in accordance with one embodiment of the present invention.

Briefly, and turning to FIGS. 2 and 3, upon a user 10 submitting to a search engine 12 a query 14 to be searched (step 301), the search engine 12 may itself perform a search based on the query 14 in a database 16 associated with such search engine 12 (step 303). In addition, the search engine 12 may send the query 14 to one or more partners 18 (step 305), where each partner 18 performs a search based on the query 14 in a database 20 associated with such partner 18 (step 307). The search engine 12 then receives search results 22 corresponding to the query 14 returned to the search engine 12 by such partner 18 (step 309).

In particular, the search engine 12 may submit the query 14 to a particular partner 18 in a call to a proxy 24 representative of the partner 18 (step 305a). Typically, both the search engine 12 and the proxy 24 are software constructs operating on one or more servers, although either may alternatively be a hardware construct, too. The search engine 12 and the proxy 24 may of course be set up in any particular arrangement such as that which would be suitable and appropriate for performing the functions required thereof, and such arrangements should be known or apparent to the relevant public.

Significantly, the proxy 24 may perform a pre-submission transform on the query 14 to place the query 14 in a form more amenable to the partner 18 (step 305b), and then in fact sends the transformed query 14 to the partner 18 by way of an appropriate communications medium (step 305c). The proxy 24 also receives the returned search results 22 (step 309a) and may perform a post-submission transform on the search results 22 to place the sea form more amenable to the search engine (step 309b), and then in fact forwards the transformed search results 22 to the search engine 12 (step 309c).

Once all search results 22 have been received from all partners 18 by way of the proxies 24 thereof, the search engine 12 then combines all the results 22 and performs any finishing functions on the combined results such as culling duplicates, sorting, and ranking (step 311). Thereafter, the search engine 12 transmits the finished results 22 to the user 10 for display thereto, typically on a computing device thereof (step 313).

As was pointed out above, in the prior art, the proxy 24 for each partner 18 was written specifically for such partner 18, and required a significant amount of time to write, debug, and otherwise approve such a specific proxy, on the order of weeks. In one embodiment of the present invention, then, and turning now to FIG. 4, each proxy 24 is based on a common generic proxy 24, and the generic proxy 24 for a particular partner 18 is rendered relevant to such particular partner 18 by being provided with configuration information 26 specific to such particular partner 18. Such configuration information 26 may for example be located in a registry according to each partner 18 The generic proxy 24 may be a class from which each individual proxy 24 is instantiated, or may merely be copied to create each individual proxy 24. Alternatively, the generic proxy 24 may be a single entity that represents each individual proxy 24 at various times merely by being provided with corresponding configuration information 26, perhaps during a call, or by being provided with an identifier of the partner 18 and then itself finding the corresponding configuration information 26. Additionally, each individual proxy 24 may be created based on the generic proxy in any other appropriate manner without departing from the spirit and scope of the present invention.

Note that while the configuration information 26 for a particular partner 18 is particularly relevant to the individual proxy 24 for such partner 18, such configuration information 26 may also be relevant to other functions external to such individual proxy 24 such as those performed by the search engine 12 and the like. For example, prior to sending a query 14 to a proxy 24, it may be necessary to perform pre-proxy processing based on the partner 18, including when to send the query 14 to the proxy 24 and whether to send the query 14 to the proxy 24. In particular, the configuration information 26 for each partner 18 may have an Order Value that determines the order of sending the query 14 to the corresponding proxy 24 as among all proxies 24, and whether such sending is done serially or in parallel. In addition, the configuration information 26 for each partner 18 may have Send Logic that determines whether the query 14 should go to the corresponding proxy 24 at all. With regard to the latter, it may for example be the case that a particular partner 18 that specializes in flowers should be sent a query 14 only if the query 14 includes a flower-related term.

Accordingly, creating a proxy 24 based on the generic proxy for a new partner 18 or modifying same is merely a matter of setting or re-setting the configuration information 26 corresponding to such partner 18, which can be done in a matter of minutes or so. Moreover, only the common generic proxy 24 need be developed, written, debugged, etc. and any changes, updates, modifications, fixes, and the like to the generic proxy 24 are automatically propagated to all proxies 24 based on such generic proxy 24 for all partners 18.

Figure 4:
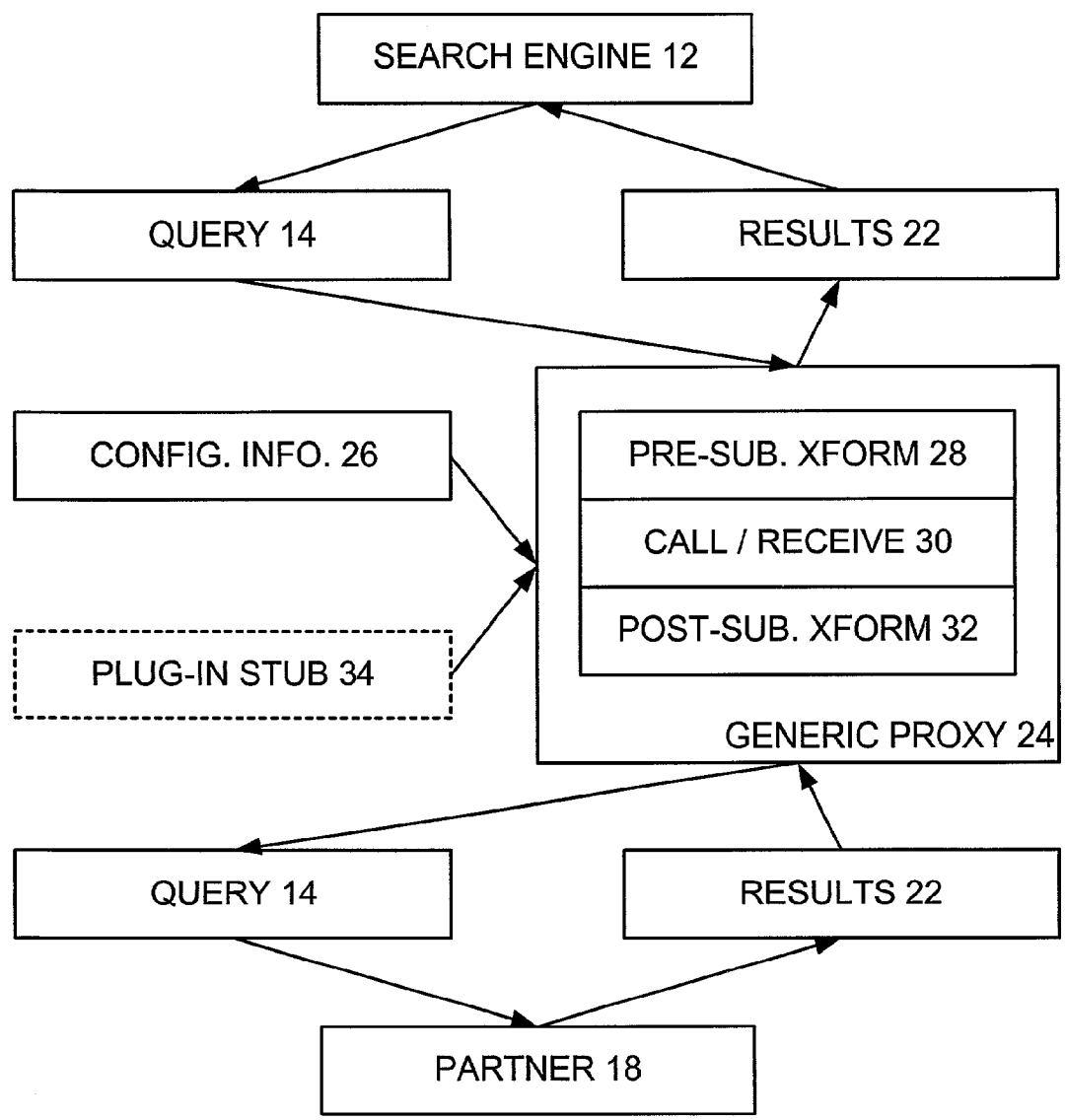
FIG. 4 is a block diagram showing a generic proxy for use with the search engine and partner of FIG. 2 based on configuration information corresponding to the partner in accordance with one embodiment of the present invention.

As shown in FIG. 4, the generic proxy 24 and each partner or individual proxy 24 based thereon has three main functions and therefore three main parts: a pre-submission transform portion 28, a partner call and receive portion 30, and a post-submission transform portion 32. As may be appreciated, the generic proxy 24 in particular has for each portion 28, 30, 32 all the functionality necessary with respect to most any particular partner 18. Thus, and by example, if a first partner 18 requires a first set of partner call and receive functionality and a second partner 18 requires a second set of partner call and receive functionality, the partner call and receive portion 32 should include therein both the first and the second sets of functionality.

The pre-submission transform portion 28 performs any necessary pre-submission transforms on a received query 14 to place the query 14 in a form more amenable to the partner 18 (step 305b). In particular, such portion 28 receives the query 14 from the search engine and parses variables and variable names therefrom. The pre-submission transform portion 28 of the generic proxy 24 should be able to receive and parse queries 14 of multiple data types to support pre-transform logic and data for most any partner 18.

In one embodiment of the present invention, the pre-submission transform portion 28 transforms the query 14 into an http call to a partner 18 by inserting the parsed query into such http call. Based on the partner 18, the portion 28 receives corresponding configuration information 26 including a URL Prefix, which is typically "http://"; a URL Host, which is typically a base URL; a URL Suffix, which is typically a path; and a Query Sub-string, which is typically employed to map the argument names and values parsed from the query 14 to data inserted into the call string to the partner 18. An example of a Query Sub-String may be:

&querykeyword=<~q~>&first=<~first~> . . . , and a full provider call may be built by concatenating the aforementioned to result in:

[URL Prefix][URL Host][URL Suffix][Query Sub-string], where Query Sub-string contains the parsed query 14.

For example, the call:

http://goto.com:6060/d/search/?Keywords=dog+food is constructed based on a URL Prefix of "http://", a URL Host of "goto.com:6060", a URL Suffix of "/d/search/" and a Query Sub-String of "dog food" as the keywords.

The partner call and receive portion 30 provides the actual mechanism for sending the call based on the query 14 to the partner 18 (step 305c) and receiving the returned results 22 (step 309a). In particular, such portion 30 receives the call from the pre-submission transform portion 28, communicates same to the partner 18 by way of an appropriate communications medium, and then waits for the returned results by way of the same or another communications medium. The partner call and receive portion 30 of the generic proxy 24 should be able to send calls to and receive return results 22 from most any partner 18.

In one embodiment of the present invention, the partner call and receive portion 30 sends the call and receives the returned results 22 based on the partner 18 by receiving corresponding configuration information 26 including a DNS/IP Name, which point to a particular DNS or IP address for the partner 18; fault tolerance values specific to the partner 18; an On/Off Value, which indicates whether the particular proxy 24 for the partner 18 is to be enabled or disabled; a Connect Timeout Value; a Receive Timeout Value, a Send Timeout Value; a Retry Value, which specifies a number of times to retry after a connect, receive, or send timeout; and a Max Connection Value, which specifies a maximum number of permissible connections to the partner 18 for purposes of limiting latency in connecting to such partner 18. Note that the Generic Proxy may have default values for the Connect Timeout Value, the Receive Timeout Value, the Send Timeout Value; the Retry Value, and/or the Max Connection Value, in the case where the configuration information 26 for a partner 18 does not specify same. Note, too, that a Retry Count Value must be maintained in an appropriate storage location if a retry is necessary, and a Connection Value must likewise be maintained in an appropriate storage location to track the number of connections to the partner 18.

For example, for one particular partner 18, DNS/IP Name may be set to "URLHost =http://msnpanel.goto.com/d/search/p/msnpanel/xml/", On/Off Value may be set "On", Connect Timeout may be set to 500 milliseconds, Receive Timeout may be set to 2000 milliseconds, Send Timeout may be set to 500 milliseconds, Retry Value may be set to 2, and Max Connection Value may be set to 30.

Of course, the partner 18 may return the search results 22 in response to the query 14 in any appropriate form for example, the partner 18 may employ a pre-defined schema such as the following:

```
Searchresults
    control
        First        [Number of first result returned by provider]
        Last         [Number of last result returned by provider]
        Total        [Total number or results provider should return]
        Nextargs     [URL arguments search appends to provider
                      URL to get next page]
        Prevargs     [URL arguments search appends to provider
                      URL to get previous page]
    Global
      Trackurl
      Image
    Result
      Title
      Description
      URLFriendly  [URL displayed to user (no redirects)]
      URLencode    [Friendly URL url-encoded]
      trackURL     [Tracking URL from partner (URL redirect
                    wrapped)]
      Category     [Category(s) the result is in]
      Sponsor      [Result Sponsor Logo]
        Name       [Logo alt text]
        URL        [Logo link URL]
        LogoURL    [URL to logo]
      Price        [price element]
      MoreinfoText [more info text]
      MoreinfoURL  [more info URL]
      Extendedinfo [Catch all for cdata]
```

An example of results 22 returned according to the above schema is set forth in the appendix. Of course, any appropriate schema may be employed without departing from the spirit and scope of the present invention.

The post-submission transform portion 32 performs any necessary post-submission transforms on results 22 returned from a partner to place the results 22 in a form more amenable to the search engine 12 (step 309*b*). In particular, such portion 32 receives the returned results 22 from the partner 18 and formats the results according to a common template. Accordingly, the results 22 from each of several varying partners 18 after respective post-submission transforming all look similar to the search engine 12, and all the results 22 from all of the partners 18 are materially indistinguishable by the search engine 12 as to source and can be handled in a similar manner by such search engine 12. The post-submission transform portion 32 of the generic proxy 24 should be able to receive returned results 22 from most any partner 18 and support post-transform logic on all of such returned results 22.

In one embodiment of the present invention, the post-submission transform portion 32 transforms the returned results 22 one or more times based on one or more pre-determined transforms. The transforms may be executed in a pre-determined order, and may include a transform that converts UTF8 to codepage X, a transform that wraps data in XML in cdata as a blob, a format A to format B transform such as XSLT to XML, a transform unique to the search engine 12, and the like. Of course, any appropriate transform may be included without departing from the spirit and scope of the present invention. In one embodiment of the present invention, the post-submission transform portion 32 executes the transforms on the returned results 22 based on the partner 18 by receiving corresponding configuration information 26 including whether each transform should be enabled or skipped.

Although it is intended that the generic proxy 24 support any and all partners 18, it is to be understood that on occasion such generic proxy 24 does not have a required functionality to support one or more particular partners 18. Accordingly, and in one embodiment of the present invention, the generic proxy 24 can accept and incorporate thereinto additional functionality by way of one or more plug-in stubs 34. As may be appreciated, each plug-in stub 34 can be directed to providing logic for a particular partner 18, or logic for a particular portion 28, 30, 32 of the generic proxy. For example, one plug-in stub 34 may be added to provide addition post-transform logic to support multiple partners 18, while another may be added to provide comprehensive logic to support a particular partner 18.

Note, too, that additional functionality may be provided for supporting a partner 18 by specifying relevant corresponding configuration information 26 for such partner 18. Such additional functionality-type configuration information 26 may include relevant pre- and/or post-submission transform information and/or functionality, for example.

Conclusion

The programming necessary to effectuate the structures of the present invention and the processes performed in connection with the present invention is relatively straightforward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a generic proxy 24 that allows adding a new partner 18 or modifying same in a relatively easy and fast manner with minimal operational work, little effort and time, and with little modification to the search engine 12 itself. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

APPENDIX

Following is an example of results 22 as returned from a provider 18 according to the schema set forth above:

```
<?xml version="1.0" encoding="UTF-8" ?>
  <searchresults xmlns:xsi="http://www.w3.org/2000/10/XMLSchema-
  instance" xsi:noNamespaceSchemaLocation="gxml.xsd">
    <control>
      <first>1</first>
      <last>3</last>
        <nextargs>Keywords=dog%20food&xargs=00u3hs9yo
```

-continued

```
         ayystTDW3NVAwMmlGtQOigjLUFzDVjH8AB%2FI%2
         B</nextargs>
    </control>
    <global>
       <trackurl>http://a840.g.akamai.net/n/840/614/2ba3a9d42148
         e9/www.goto.com/images/impression.gif;$affiliate$msnpanel_
         inclusion_xml?cacheBuster=2B22E4E083D2D1E0</trackurl>
    </global>
    <result score="1">
       <url>www.iams.com</url>
         <urlencode>http://www.goto.com/d/sr?xargs=00u3hs9
         yoaj1UOwSCDRBAGv7LOwKgHoeFSX9wVoEmNww
         X%2F6tAXNMTD2TJubzslppC58dDN6b7bG35AwS1Z
         y3VhuK%2BiSr6nNhjVAmcUzUjjK4%2FhCYCaU80s8s
         VuyQLyZ4LzT7s9eQ6J%2Bjdpcj4PVj2bDP4LoHt3T5A
         HdtaBitqxMQjpPIXH%2FhilqKMWoD86ENk%3D</url
         encode>
       <title>You Could Win a Year of Pet Food Free</title>
       <desc>Visit iams.com to learn all about dogs and cats.
         Register with us and you will be entered into a quarterly
         drawing for a year's supply of pet food. Visit soon.</desc>
    </result>
    <result score="2">
       <url>fancypaws.com</url>
         <urlencode>http://www.goto.com/d/sr?xargs=00u3hs9
         yoaj1UOzSDChBAGn%2BXOIKcPB8KkV9lbWGLwAhf
         GJbe3E0UyY02X5mY528KMNTBgBm4SrT1ynTGKje
         NasKnqSvd8PpaqJ3SlfC0pfbQhPxLCd%2B7ARZX5W
         eHKD9d%2Bc5ZrCVsOHUyvRzZQ5QxWvlDM0eEoag
         W%2F5Pxo%2FXcYOt4vrZ0TEwEx%2Fij73059pUE7<
         /urlencode>
       <title>All Your Dog Food Needs</title>
       <desc>Flint River Ranch Super Premium Ranch Pet Food.
         Buy it here and get free pet shampoo with your Flint River
         Ranch order over $30.00. Feed your pet the best. Name-
         brand dog foods also.</desc>
    </result>
    <result score="3">
       <url>www.petsmart.com</url>
         <urlencode>http://www.goto.com/d/sr?xargs=00u3hs9
         yoaUFVuwSCF%2FBA8GgQaOVFg9OT6P9xWMEtW
         ZPrgCfprXfeTaQm2ksmdmcnZi1zXsmuKTQE0295F2
         RmDje3Uq9AbSYxRwVu9v%2B4s8EzRDedWFE9HJg
         wmK72AUl6c5iUS685B4r8t6WaTD7GZiNvJGY6ua8d5
         %2FXn5%2Fm0R7LFYlokXUSb4gkO436ZOSihMr1Kh
         2fondgxAyeiYPFb6A0V5RAuXWPAl11kVWo%2F6Qe
         ENHNuF%2BCZFvDmAub2cEEvfq8Z0j11V0L0PQenx
         PkgeLCfu%2BWVY7cYM3SjJiFOM39%2BrnvF1%2F
         %2BhSlZdqF9Vvarxv</urlencode>
       <title>$5 Off & Free Shipping at PETsMART.com</title>
       <desc>Stock up on your favorite pet supplies with a special
         first-time offer @ PETsMART.com. Save $5 on your first
         purchase of $20 or more & receive Free basic shipping.
         Total value of $9.95!</desc>
    </result>
</searchresults>
```

The invention claimed is:

1. A search system comprising:

a search engine for receiving a search query from a user and for forwarding the received query to a partner;

configuration information corresponding to the partner; and a generic proxy for being called by the search engine with the query for the partner, for receiving and processing the query according to the configuration information corresponding to the partner, for forwarding the processed query to the partner according to the configuration information corresponding to the partner, for receiving search results responsive to the forwarded query from the partner according to the configuration information corresponding to the partner, for processing the received search results according to the configuration information corresponding to the partner, and for forwarding the processed search results to the search engine for further forwarding to the querying user, whereby each of several partners has corresponding configuration information unique thereto and only the generic proxy need be developed for all of the several partners.

the generic proxy being a single entity that represents each of several partners at various times by retrieving the configuration information corresponding thereto based on an identification of the partner in the call from the searh engine, the generic proxy including a pre-submission transforms portion for performing any necessary pre-submission transforms on the received query according to the configuration information corresponding to the partner to place the query in a form amenable to the partner, a partner call and receive portion for sending the transformed query to the partner and receiving the search results from the partner according to the configuration information corresponding to the partner, and a post-submission transform portion for performing any necessary post-submission transforms on the received search results from the results in a form amenable to the search engine, and wherein each portion has all functionality necessary with respect to multiple partners.

2. The system of claim 1 wherein the generic proxy is instantiated as an individual proxy for the partner based on the configuration information corresponding thereto.

3. The system of claim 1 wherein the pre-submission transform portion parses the received query and transforms the parsed query into a call to the partner according to the configuration information corresponding to the partner.

4. The system of claim 1 wherein the partner call and receive portion sends the transformed query to the partner and receives the search results from the partner according to the configuration information corresponding to the partner including a member of a group consisting of a DNS/IP Name which point to a particular DNS or IP address for the partner, a fault tolerance value specific to the partner, an On/Off Value which indicates whether sending to the partner is to be enabled or disabled, a Connect Timeout Value, a Receive Timeout Value, a Send Timeout Value, a Retry Value which specifies a number of times to retry after a connect, receive, or send timeout, a Max Connection Value which specifies a maximum number of permissible connections to the partner, and combinations thereof.

5. The system of claim 1 wherein the partner call and receive portion receives the search results from the partner according to a pre-defined schema.

6. The system of claim 1 wherein the post-submission transform portion formats the received search results according to the configuration information corresponding to the partner such that the formatted results from each of several varying partners all look similar to the search engine and are materially indistinguishable by the search engine as to source and can be handled in a similar manner by such search engine.

7. The system of claim 1 further comprising a plug-in stub accepted and incorporated into the generic proxy to provide additional functionality thereto.

8. A method of searching comprising:

receiving a search query from a user at a search engine;

calling a generic proxy by the search engine with the query for being forwarded to a partner;

receiving and processing the query by the generic proxy according to configuration information corresponding to the partner;

forwarding the processed query by the generic proxy to the partner according to the configuration information corresponding to the partner;

receiving search results by the generic proxy responsive to the forwarded query from the partner according to the configuration information corresponding to the partner;

processing the received search results by the generic proxy according to the configuration information corresponding to the partner; and forwarding the processed search results by the generic proxy to the search engine for further forwarding to the querying user, the method further comprising retrieving by the generic proxy the configuration information corresponding to the partner basd on an identification of the partner in the call from the engine, the method comprising performing any necessary pre-submisssion transforms on the received query by the generic proxy according to the configuration information corresponding to the partner to place the query in a form amenable to the partner, sending the generic proxy according to the configuration information corresponding to the partner, and performing any necessary post-submission transforms on the received search results from the partner by the generic proxy according to the configuration information corresponding to the partner to place the results in a form amenable to the search engine.

9. The method of claim 8 comprising parsing the received query and transforming the parsed query into a call to the partner by the generic proxy according to the configuration information corresponding to the partner.

10. The method of claim 8 comprising sending the transformed query to the partner and receiving the search results from the partner by the generic proxy according to the configuration information corresponding to the partner including a member of a group consisting of a DNS/IP Name which point to a particular DNS or IP address for the partner, a fault tolerance value specific to the partner, an On/Off Value which indicates whether sending to the partner is to be enabled or disabled, a Connect Timeout Value, a Receive Timeout Value, a Send Timeout Value, a Retry Value which specifies a number of times to retry after a connect, receive, or send timeout, a Max Connection Value which specifies a maximum number of permissible connections to the partner, and combinations thereof.

11. The method of claim 8 comprising receiving the search results from the partner by the generic proxy according to a pre-defined schema.

12. The method of claim 8 comprising formatting the received search results according to the configuration information corresponding to the partner such that the formatted results from each of several varying partners all look similar to the search engine and are materially indistinguishable by the search engine as to source and can be handled in a similar manner by such search engine.

13. The method of claim 8 comprising accepting and incorporating into the generic proxy a plug-in stub to provide additional functionality thereto.

\* \* \* \* \*